(12) United States Patent
Scaringe

(10) Patent No.: US 6,308,523 B1
(45) Date of Patent: Oct. 30, 2001

(54) SIMPLIFIED SUBCOOLING OR SUPERHEATED INDICATOR AND METHOD FOR AIR CONDITIONING AND OTHER REFRIGERATION SYSTEMS

(75) Inventor: Robert P. Scaringe, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 09/528,722

(22) Filed: Mar. 20, 2000

(51) Int. Cl.⁷ .................................................. F25B 49/02
(52) U.S. Cl. .............................. 62/127; 62/129; 235/487; 283/115
(58) Field of Search ........................... 62/125, 127, 129; 235/487; 374/141, 162; 283/32, 48.1, 66.1, 70, 115

(56) References Cited

U.S. PATENT DOCUMENTS

| | | | |
|---|---|---|---|
| 4,018,061 | 4/1977 | Williamitis | 62/125 |
| 4,408,905 * | 10/1983 | Ehrenkranz | 374/157 |
| 4,545,212 | 10/1985 | Noda | 62/129 |
| 4,923,806 | 5/1990 | Klodowski | 436/39 |
| 5,071,768 | 12/1991 | Klodowski | 436/39 |
| 5,216,623 * | 6/1993 | Barrett et al. | 364/550 |
| 5,263,744 * | 11/1993 | Linder | 283/115 |
| 5,377,496 | 1/1995 | Otto et al. | 62/129 |
| 5,457,965 | 10/1995 | Blair et al. | 62/129 |
| 5,458,376 * | 10/1995 | Biewald | 283/65 |
| 5,586,445 | 12/1996 | Bessler | 62/126 |
| 5,627,770 | 5/1997 | Barbier et al. | 364/559 |
| 5,745,130 * | 4/1998 | Becerra et al. | 347/14 |
| 5,820,261 * | 10/1998 | Yam | 374/2 |
| 5,820,262 | 10/1998 | Lechner | 374/45 |
| 5,833,272 * | 11/1998 | Schou | 283/115 |
| 5,975,756 * | 11/1999 | Jones | 374/141 |
| 6,018,955 * | 2/2000 | Kaneko et al. | 62/125 |
| 6,086,245 * | 7/2000 | Yam | 374/2 |
| 6,105,368 * | 8/2000 | Hansen | 60/646 |
| 6,116,709 * | 9/2000 | Hirabayashi et al. | 347/14 |

OTHER PUBLICATIONS

Fitzgibbons, "Application, Installation and Service of Thermostatic Expansion Valves", *Refrigeration Service Engineers Society*, 620–74, Section 18, 1975.

E.I. Du Pont de Nemours & Co., "Thermodynamic Properties of Freon 22 Refrigerant".

www7.thomasregister.com, Internet listing for American Thermal Instruments, Inc., (including listing for Miscellaneous Thermometers).

Whitman et al., "Refrigeration and Air Conditioning Technology", Delmar Publishers Inc., Section IV, 19.11 to 19.14.

* cited by examiner

*Primary Examiner*—William E. Tapolcai
(74) *Attorney, Agent, or Firm*—Crowell & Moring LLP

(57) ABSTRACT

A simple field installable/removable indicator is usable with a field pressure measurement to indicate the degree of subcooling or superheat of refrigerant in a vapor-compression or refrigeration system. The indicator can be attached to a pipe at an appropriate location in the system. The indicator can be used with a pressure measurement obtained at an existing service valve. Temperature-indicating liquid crystals or other chemicals, or alternatively, a conventional thermometer included on the indicator can be used with a scale which shows the superheat or subcooling without requiring saturation curves or tables.

26 Claims, 3 Drawing Sheets

SIMPLIFIED SUBCOOLING OR SUPERHEATED INDICATOR AND METHOD FOR AIR CONDITIONING AND OTHER REFRIGERATION SYSTEMS

BACKGROUND AND SUMMARY OF THE INVENTION

The present invention relates to a simple field installable/removable indicator which can be used with a field pressure measurement to indicate the degree of subcooling or superheat of the refrigerant contained in the pipe (tubing, or refrigerant-containing component) to which it is attached. More particularly, the present invention relates to a superheat or subcooling test indicator used in vapor compression refrigerators and the like which can be attached to the system and used in conjunction with a pressure measurement via the existing service valve, making the superheat or subcooling calculation easy and fast, without the need to understand the use of a pressure-temperature saturation curve or table. A series of individual temperature indicating liquid crystals or other well-known temperature indicating chemicals or the like are located on a self-adhesive strip. Alternatively a traditional thermometer can also be utilized.

As used herein, "vapor-compression system" and "refrigeration system" refer to refrigerators, heat pumps, air conditioners or any other system which produces a refrigeration or cooling effect using refrigerant evaporation.

At the refrigerant vapor outlet of most evaporators of vapor-compression systems, it is expected that only vapor will be present. The number of degrees that the vapor is warmer than the saturation temperature corresponding to the actual pressure of the vapor is called the "vapor superheat." The superheat is a measure of how much of the evaporator is effective in the cooling process. A high superheat suggests that much of the evaporator is not being used for evaporation, meaning the refrigerant charge is low. A low vapor superheat suggests that complete evaporation may not occur, which may be indicative of a blocked or reduced airflow over the evaporator, a clogged filter, or a failed blower fan.

At the refrigerant liquid outlet of the condenser, it is expected that only liquid refrigerant will be present. The number of degrees that the refrigerant temperature is cooler than the saturation temperature corresponding to the refrigerant pressure is called the "liquid subcooling." A high degree of liquid subcooling suggests that much of the condenser is not being used for condensing vapor, but instead is being employed for subcooling, a much less effective mode of heat transfer.

The reason that measurement of actual superheat is desired is that it is well known as the best method to properly charge a vapor-compression system with refrigerant. It is also an excellent check for proper system charge on an operating unit. For example, operation at evaporator superheats above 10° F. typically indicate a low refrigerant charge and at less than 3° F. indicates an overcharged system.

Checking evaporator vapor superheat and condenser liquid subcooling are common maintenance procedures. The calculation of superheat and subcooling requires, however, a pressure/temperature saturation curve (which is specific to the refrigerant in the system), and at least a rudimentary understanding of the thermodynamics of evaporation and condensation. Other more complex approaches have been proposed to avoid the need to understand a pressure/temperature relationship and to calculate the superheat or subcooling for the user.

In U.S. Pat. No. 5,820,262, a refrigerant sensor provides, within a common assembly, pressure, temperature and superheat measurements and calculations with respect to a refrigerant material. The sensor includes a pressure transducer for measuring the pressure of the refrigerant material and a temperature transducer for measuring the temperature of the refrigerant material. The pressure and temperature measurements are used by a microprocessor to calculate the superheat value of the refrigerant material.

Similarly, U.S. Pat. No. 5,627,770 discloses a gage having sensors for observing temperature and pressure. The gage includes a display and an internal computer with a stored program. A data cartridge is separate from the gage but is connected to it with an electrical plug-type connection. The data cartridge has a non-volatile memory on which is stored data relating pressure and saturation temperature of a volatile refrigerant. The stored program contains programming instructions for measuring temperature and pressure from a source, retrieving from the data cartridge saturated temperature data corresponding to the observed pressure, and calculating/displaying superheat or subcooling.

Various low refrigerant charge-detecting devices have been proposed. For example, U.S. Pat. No. 4,545,212 discloses a superheat detector including a semiconductor pressure sensor and a semiconductor temperature sensor. An operational controller converts an output signal from the semiconductor pressure sensor to a value corresponding to a saturation temperature of the refrigerant, and produces an output electrical signal corresponding to superheat condition of the refrigerant by comparison between the saturation temperature and the output from the semiconductor temperature sensor.

U.S. Pat. No. 5,586,445 discloses a low refrigerant charge detection using a combined pressure/temperature sensor, and U.S. Pat. No. 5,457,965 discloses an apparatus for detecting a low level of refrigerant circulating through a motor vehicle refrigerant circuit. The apparatus comprises an electronic logic module, a pressure transducer and a thermistor preferably located in the refrigerant circuit between the compressor and the evaporator. The pressure transducer generates a signal indicative of the refrigerant pressure, from which the module derives a saturation temperature of the refrigerant. The saturation temperature is compared with the measured temperature to determine if a superheat condition exists indicative of low refrigerant charge.

While no simple, passive, non-electronic visual sensors for the direct determination of subcooling or superheat are known, visual sensors or indicators for use in detecting the moisture of a refrigerant in a vapor compression system are known, as seen for example, in U.S. Pat. No. 4,018,061 as well as commercial products by Parker, Alco Controls, Sporlan, Va. KMP, and others.

Other types of visual indicator systems are known for testing the presence and concentration of contaminants in a refrigerant. For example, U.S. Pat. Nos. 4,923,806 and 5,071,768 show apparatus for testing liquid or vapor contaminants in a closed system. Likewise, U.S. Pat. No. 5,377,496 shows an acid contamination indicator for closed loop vapor compression refrigeration systems. A pending patent application describes another indicator sold under the trademark "QwikCheck," and represents yet another way of visually detecting the presence of acid in a refrigeration system. Another pending patent application sold under the trademark "QwikLook," discloses another device for visually detecting the presence of moisture in a refrigeration system.

All the prior art devices and methods for automatic determination of superheat or subcooling have one thing in common, namely an electronic device to process the measured pressure and convert it to the corresponding saturation temperature for the specific refrigerant and then compare this temperature to the measured temperature to determine the superheat or subcooling. A discussion of how to manually calculate superheat from the measured temperature and pressure along with a pressure temperature saturation curve is well known in the art and discussed in numerous service manuals.

The 1975 Refrigeration Service Engineers Society (RSES) literature is one such source of instruction and includes a simple pictorial by Sporlan Valve Company on how to check superheat. The calculation of superheat or subcooling is performed manually by 1. measuring the pressure,
2. using a pressure/temperature saturation table or curve to convert this pressure to the corresponding saturation temperature of the refrigerant, then
3. measuring the actual temperature, and
4. calculating the difference between these temperatures to determine subcooling or superheat (where subcooling temperatures are below the saturation temperature and superheat temperatures are above).

Methods to produce a low-cost disposable thermometer that is flexible enough to be adhesively attached to the refrigerant-containing structure or tubing and/or methods of mechanically attaching the bulb of a more conventional thermometer to the refrigerant-containing structure or tubing device are also well know in the art.

It is an object of the present invention to provide a simple and relatively inexpensive indicator for indicating with sufficient accuracy the degree of superheat or subcooling in a vapor-compression or refrigeration system.

This object has been achieved by using temperature indicators in combination with a pressure measurement. That is, rather than calibrating these well-known temperature indicators to indicate an absolute temperature which is their normal use, a combination of pressure and temperature scales are utilized. In this way, an inexpensive thermometer becomes a superheat or subcooling indicator, avoiding the need for complex electronic devices or an understanding of thermodynamics of two-phase fluids. The temperature indicating substance is affixed (either permanently or removably) to the refrigerant containing device at a location where the superheat or subcooling is to be determined. Typically this is the exit pipe (or tubing) of an evaporator for superheat measurements and the exit pipe (or tubing) of a condenser for a subcooling measurement. The scale on the temperature-measuring device contains both pressure readings and temperature graduations. This device will not indicate temperature with this pressure and temperature scale because it has been devised as a simple way to determine superheat, using an ordinary low-cost thermometer (such as a liquid crystal thermometer) with a unique scale (and combined with a field refrigerant pressure measurement, measured saturation temperature measurement, measured air temperature reading, or assumed saturation condition).

The indicator according to the present invention is attached to the system (typically a section of tubing where the superheat or subcooling is to be determined). Pressure is then measured at a convenient service valve in the approximate area of the indicator. For example, superheat is measured on the evaporator exit to determine proper system charge, and so the low-side service valve would be used to measure the pressure on the low-side (evaporator outlet side) of the system. Subcooling is measured on the condenser exit to determine proper system charge. The high-side service valve is thus used to measure the pressure on the high-side (condenser outlet side) of the system. Adjustments for pressure changes between the location of the indicator and pressure measurement can be made if desired, or this relatively small effect can be neglected. The measured pressure is then used to find the starting point pressure on the indicator's unique scale.

Having thus identified the starting point pressure, the number of temperature graduations between the starting point pressure and the indicator's location (e.g., liquid crystal that is illuminated or the mercury location on a typical thermometer) are then counted. There is no temperature scale, only temperature graduations. (For a typical liquid crystal thermometer, the indicator's location is identified by a green crystal color instead of a black color) . This discussion assumes that as temperature increases the temperature indicator moves further to the right. The number of temperature graduations to the right of the starting pressure indicates the system superheat in degrees (using the units chosen), whereas the number of temperature graduations to the left of the starting pressure would indicated the amount of subcooling in the temperature units shown. Therefore superheat or subcooling is determined without any expensive devices and without any understanding of the thermodynamics of fluid evaporation or condensation.

The disclosed invention is not, as above noted, an absolute temperature measuring device per se, but rather a new scale that can be applied to any temperature measuring thermometer to indicate superheat or subcooling directly without the use of refrigeration pressure temperature charts and without any understanding of thermodynamics.

The device of the present invention can advantageously be used by non-technical personnel as a simple system status indicator. This device can advantageously be used to indicate low refrigerant charge which means that refrigerant has leaked from the system. For example, when the superheat exceeds a certain level, the system is checked for leaks because the charge appears low. Although the design superheat of a system varies somewhat, it is safe to say that superheats in excess of 15° F. are typically out of the normal operating range and are an indication of poor evaporator performance caused by low refrigerant charge. Low exit superheat is indicative of loss of heat load to the evaporator, indicative of loss of airflow such as a blower failure, clogged air filter, or blocked flow path. Therefore this device can be used with great advantage to diagnose common system problems or to alert the non-technical person to call for service on the unit.

The scale configuration discussed up to this point requires the use of a pressure measurement to obtain the starting point for the superheat or subcooling determination. Alternatively, to simplify use for non-technical users, the device can also be configured with the pressure scale replaced by a second temperature scale. Theoretically this second temperature scale is the saturation temperature which corresponds to the replaced measured saturation pressure (i.e., for the refrigerant used); however, the non-technical user need not realize this. Instead, the exiting evaporation air temperature can also be used as the measured variable to determine the starting point location instead of pressure because the exiting conditioned air temperature is known to be related to the evaporator's saturation temperature.

Furthermore, for the relatively narrow air flow operating range of these units, the difference or offset between the air temperature and the saturation temperature will be approximately constant and can be assumed constant. There are several ways to adjust for this constant offset, including performing a field measurement by the installer of this indicator (and writing this offset on the indicator for later use by the non-technical user) or calculating this offset based on the known air flow and refrigerant characteristics of the unit.

Converting the pressure scale to an adjusted measured air temperature scale means that a non-technical user can now determine the actual operating condition without any tools or understanding whatsoever of how the system performs thermodynamically.

In one embodiment, the exiting evaporator air temperature for superheat calculations (and exiting condenser air temperature for subcooling calculations) is measured by the user using a known type of thermometer. This temperature information is then used as the starting point instead of the pressure to determine the superheat and subcooling. Thereby, a second temperature-measuring thermometer, located in the air flow and not in thermal communication with the device containing the refrigerant can be employed to obtain the starting location for the superheat or subcooling determination. In this way, the equipment operator can be instructed occasionally to make this simple check and to call for service if the superheat or subcooling are outside the normal operating range of the system. Therefore, even though the equipment owner has no understanding of the operation of the system, this simple device indicates problems to the owner, allowing him or her to call for service before more serious damage occurs or before the system stops operating completely.

Using the knowledge that air conditioners have their evaporator coils set to operate at a prescribed temperature, as do refrigerators, heat pumps, and freezers, and that these systems have a prescribed normal condenser subcooling and evaporator superheat, I have discovered that an even simpler status indicator can be configured by using the normal set point evaporator or condenser saturation temperature and the normal set point superheat. In this way, the indicator can display "Normal Operating Range" and can be configured to "Call for Service" if the illuminated indicator is outside this allowable range. While such an indicator is slightly less accurate than more complex devices, it requires no secondary measurement, and can be affixed to the unit for later monitoring by a non-technical equipment owner or user. When the indicator indicates operation outside the normal range, the individual is alerted to call for service. For example, an indicator scale can be provided for a typical air conditioner with an evaporator coil set point operating point (saturation point) of 40° F., and a design operating superheat range of 3–15° F. Of course, it is within the contemplation of this invention that these various scales can be combined on a single indicator where the technician's superheat scale using measured pressure is combined with a non-technical owners/users scale.

BRIEF DESCRIPTION OF THE FIGURES

Other objects, advantages and novel features of the present invention will become apparent from the following detailed description of the invention when considered in conjunction with the accompanying drawings.

DETAILED DESCRIPTION OF CURRENTLY PREFERRED EMBODIMENTS

Figure 1:
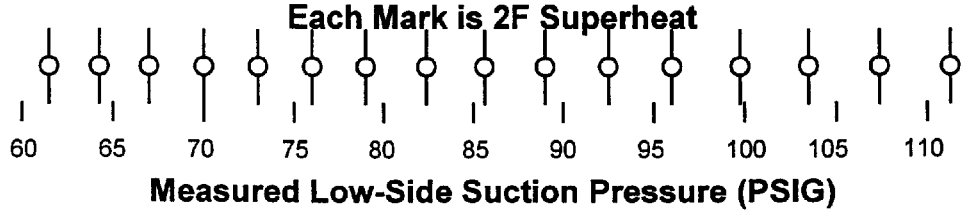
FIG. 1 is a schematic layout for one embodiment of a R-22 (HCFC-22) superheat indicator scale according to the present invention for use with discrete micro-encapsulated liquid crystals (in 2° F. increments) and for pressures ranging from 34 to 110 PSIG.
Figure 8:
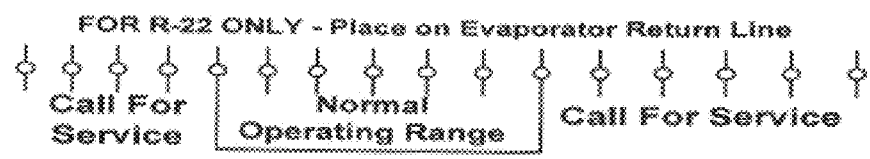
FIG. 8 is a schematic layout for the R-22 (HCFC-22) superheat indicator scale for use with discrete micro-encapsulated liquid crystals (in 2° F. increments) where the saturation pressure is assumed to be 68.51 PSIG which corresponds to a saturation temperature of 40° F. This embodiment is a simpler but admittedly less exact status indicator that can be configured by using the normal set point saturation temperature (superheat on the evaporator or subcooling on the condenser) and the normal set point for superheat or subcooling. While such an indicator is less accurate, it requires no secondary measurement, and can be affixed to the unit for later monitoring by a non-technical equipment owner or user. When the indicator indicates operation outside the normal range, this would alert the individual to call for service. Such an indicator scale is used for a typical air conditioner with an evaporator coil set point operating point (saturation point) of 40° F. and a normal operating superheat range of 3–15° F.
Figure 9:
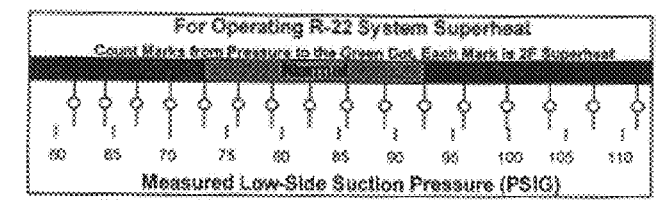
FIG. 9 displays one possible combination of the scales on the above-described indicators, and represents a currently preferred embodiment. In this configuration, the technician's superheat scale using measured pressure shown in FIG. 1 is combined with a non-technical owners/users scale shown in FIG. 8 to produce a single device with usefulness to both the qualified technician (to easily determine the superheat precisely) and the non-technical equipment owner (to verify operation within the normal range).

FIG. 9 shows an embodiment of the indicator which can be manufactured on a matrix, having an adhesive backing. The scale of FIG. 1 is shown in this embodiment along with the scale of FIG. 8 in which the "normal" central portion can be colored in green and the left and right "call for service" portions can be colored in red to alert the technician to the existence of a problem. The method of using such an indicator is now described.

First, a convenient pressure interval is determined. This depends on the desired accuracy of the final indicator and the desired cost of the finished product. A small pressure increment requires a correspondingly more accurate thermometer. For exemplary purposes, a 10 psi increment will typically be used although other increments are contemplated as well.

The refrigerant for the indicator must also be selected. Each indicator is specific to a refrigerant and while multiple scales could be located on a single device, the simplest configuration is to have a scale for only one refrigerant. For this example R-22 is the refrigerant selected. Again, however, multiple scales are contemplated as within the scope of the present invention.

The operating pressure range must be determined. Again this determination is simply a cost and expected operating range issue. A broader scale requires a wider range indicator which increases the flexibility and the cost. For the air conditioning system application contemplated here, the evaporation temperature is typically 40° F., with 10° F. of superheat. I propose using a thermometer with an approximate range of 35° F. to 65° F. For R-22 refrigerant, this corresponds to a saturation pressure of 61.4 psig to 111.23 psig (using DuPont Saturation Pressure/Temperature data located in its Thermodynamic Properties of Freon 22, Copyright 1964). Using a different source for the saturation data provides slightly different numbers because of the slight table variations. Rounding to the nearest 10 psi corresponds to a pressure scale of 60 psig to 110 psig.

For each pressure between the selected minimum and maximum pressure(60 to 110 psig in this example), there is a corresponding saturation temperature for the refrigerant selected. The pressure scale is laid out so that the corresponding saturation temperature is the temperature indicated by the thermometer. The relationship between saturation pressure and saturation temperature is not constant. This means that, if mercury or other expanding indicator types of thermometers are used, the spacing of the pressure increments is not constant but must be adjusted to achieve the desired correlation between the pressure reading's corresponding saturation temperature and the actual temperature reading.

For example if the accuracy of the thermometer were 1° F., then the pressure corresponding to each 1° F. change in temperature would be scribed on the pressure scale (and the spacing on the resulting pressure scale would not be uniform). Alternatively, if a liquid crystal thermometer is utilized, which is the currently preferred embodiment, the temperature indication is not continuous but rather discrete droplets of temperature sensitive liquid crystals that illuminate when the temperature is reached. In this latter case, the pressure scale can be maintained at a constant spacing interval by adjusting the spacing of these discrete indication chemical droplets. For this liquid droplet application, the temperature accuracy of the liquid crystal is 2° F. so liquid crystal droplets are laid out in increments of 2° F. on the proposed scale, with increasing temperature on the scale moving toward the right.

With regard to the scale shown in FIG. 1, starting at 61.474 psig, which corresponds to 35° F., for R-22 refrigerant a 35° F. liquid crystal, is deposited. Similarly at 64.233 psig, a 37° F. liquid crystal is deposited; at 67.065 psig, a 39° F. liquid crystal is deposited; at 69.974 psig, a 41° F. liquid crystal is deposited; at 72.959 psig, a 43° F. liquid crystal is deposited; at 76.023 psig, a 45° F. liquid crystal is deposited; at 79.165 psig, a 47° F. liquid crystal is deposited; at 82.389 psig, a 49° F. liquid crystal is deposited; at 85.69 psig, a 51° F. liquid crystal is deposited; at 89.08 psig, a 53° F. liquid crystal is deposited; at 92.56 psig, a 55° F. liquid crystal is deposited; at 96.11 psig, a 57° F. liquid crystal is deposited; at 99.76 psig, a 59° F. liquid crystal is deposited; at 103.49 psig, a 61° F. liquid crystal is deposited; at 107.32 psig, a 63° F. liquid crystal is deposited; and finally at 111.23 psig, a 65° F. liquid crystal is deposited. This scale is depicted in FIG. 1.

Temperature gradations are located below or above each liquid crystal. In addition, depending on the size of the overall indicator, temperature marks in between the liquid crystal's 2° F. increments can also be drawn. The completed scale as shown in FIG. 1 (where the circles schematically represent the locations of the liquid crystal micro-capsules) has temperature marks(but no temperature scale) above each liquid crystal indicator (and possibly in between them), and pressure marks and a scale below them.

The device is used as previously described by attaching via adhesive or the like the indicator to the refrigerant containing device to be measured, determining the pressure, and finding this pressure on the pressure scale. Then the superheat or subcooling is determined by counting the number of temperature divisions between the measured pressure (starting point) and the illuminated liquid crystal. If the illuminated liquid crystal is to the right of the measured pressure (starting point), the refrigerant is superheated and the number of temperature divisions directly indicates the degrees of superheat. Likewise, if the illuminated liquid crystal is to the left of the measured pressure, the refrigerant is subcooled and the number of temperature divisions directly indicates the degrees of superheat.

Specifically for the present invention, I currently contemplate use of common micro-encapsulated liquid crystals in 2° F. increments such as those commercially available from, for example, American Thermal Instruments, Inc. of Dayton Ohio. These specific liquid crystals illuminate green at the calculated superheat temperature, blue when they are 1° F. warmer, and tan when they are 1° F. cooler. Therefore, by using this color change behavior, tighter thermal measurements are possible or fewer thermal crystals can be used with a wider temperature spacing. For this type of liquid crystal, the superheat or subcooling can be more accurately determined by counting the number of temperature divisions between the measured pressure (starting point) and the illuminated liquid crystal.

If the illuminated liquid crystal is green and to the right of the starting point (higher temperature is towards the right)

then the superheat is simply the number of temperature divisions. If the illuminated liquid crystal is blue, however, the superheat is increased by 1° F., while if the illuminated liquid crystal is tan, the superheat is decreased by 1° F. Similarly, for subcooling determinations, if the illuminated liquid crystal is green and to the left of the starting point, then the subcooling is simply the number of temperature divisions. However if the illuminated liquid crystal is blue the subcooling is decreased by 1° F., and if the illuminated liquid crystal is tan, the subcooling is increased by 1° F.

It is also within the contemplation of the present invention to replace the pressure scale with the corresponding temperature scale and have the user measure the evaporator exit air temperature or condenser inlet air temperature to approximate the saturation temperature in the evaporator or condenser. To more accurately approximate the correct saturation temperature, an offset to account for the heat transfer temperature difference could be incorporated into this temperature conversion. This offset is calculated or measured during installation of the device and permanently recorded on the indicator. For example, if the evaporator air temperature which exits is found to be 10° F. warmer than the saturation temperature then the pressure scale could be converted to saturation temperature then increased by 10° F. and labeled "Evaporator Air Exit Temperature" instead of pressure. As discussed earlier this would simplify the use by non-technical users and would remove the need to measure a system pressure.

As noted above, the scale in FIG. 2 is similar to that of FIG. 1 except that the former uses liquid crystals which illuminate green at the design superheat temperature, blue when the crystals are 1° F. warmer and tan when they are 1° F. cooler. This approach provides a more precise thermal measurement as, alternatively, permits fewer crystals to be used with a wider temperature spacing, e.g., 4° F. instead of 2° F. as in FIG. 1.

Figure 2:
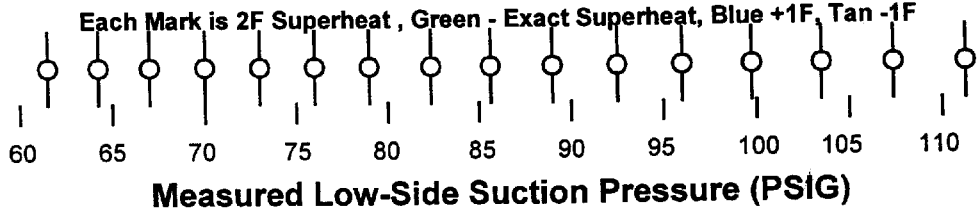
FIG. 2 is a schematic layout similar to FIG. 1 but for use with discrete micro-encapsulated liquid crystals (in 2° F. increments) and for pressures ranging from 34 to 110 PSIG. However these specific liquid crystals illuminate green at the calculated superheat temperature, blue when they are 1° F. warmer, and Tan when they are 1° F. cooler. Therefore by using this color change behavior tighter thermal measurements are possible or fewer thermal crystals can be used with a wider temperature spacing such as 4° F. instead of 2° F. to reduce cost.
Figure 3:
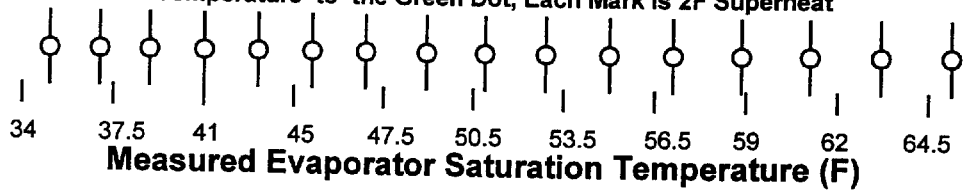
FIG. 3 is a schematic layout for the R-22 (HCFC-22) superheat indicator scale for use with discrete micro-encapsulated liquid crystals (in 2° F. increments) and using the Measured Evaporator Surface Temperature instead of the low-side suction pressure. In this embodiment the saturation pressures (of FIG. 1) were directly converted to the corresponding saturation temperatures without regard to the temperature scale that would result.
Figure 4:
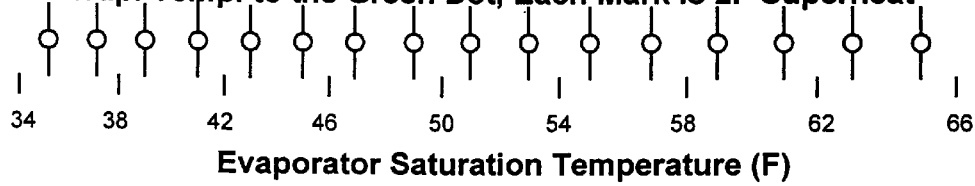
FIG. 4 is a schematic layout for the R-22 (HCFC-22) superheat indicator scale for use with discrete micro-encapsulated liquid crystals (in 2° F. increments) and using the Measured Evaporator Surface Temperature instead of the low-side suction pressure. In this embodiment, a more convenient Evaporator Surface Temperature scale in 4° F. increments has been selected.

The scale of FIG. 3 uses the measured evaporator surface temperature instead of the low-side suction pressure as in the case with the scales of FIGS. 1 and 2. This approach requires a more unusual temperature scale. The scale of FIG. 4 uses a similar approach but provides a more conventional scale appearance with the selection of 4° F. increments.

Figure 5:
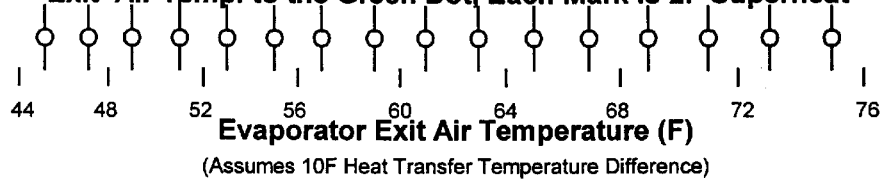
FIG. 5 is a schematic layout for the R-22 (HCFC-22) superheat indicator scale for use with discrete micro-encapsulated liquid crystals (in 2° F. increments) and using a Evaporator Exit Air Temperature instead of the low-side suction pressure. This scale assumes that the evaporator air temperature is 10° F. warmer that the actual saturation temperature.
Figure 6:
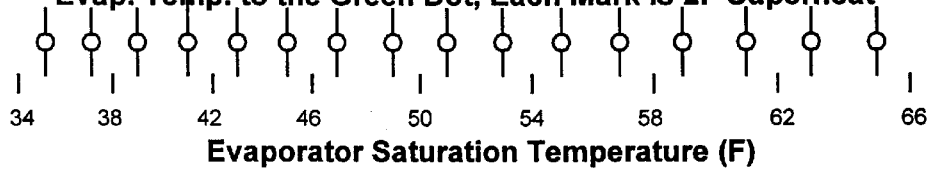
FIG. 6 is a schematic layout for the R-22 (HCFC-22) superheat indicator scale for use with discrete micro-encapsulated liquid crystals (in 2° F. increments) and using an adjusted Evaporator Saturation Temperature instead of the low-side suction pressure. The Evaporator Saturation temperature is determined from a measured Evaporator Air Exit Temperature minus a constant Temperature Offset. The Temperature Offset was determined (at the time the indicator was initially installed, and assumed constant), by the technician as the difference between the measured Evaporator Saturation Temperature and the measured Exit Air Temperature. This information is was recorded on the indicator for subsequent use.

The scale of FIG. 5 uses the evaporator exit air temperature instead of low-side suction pressure and assumes that the evaporator air temperature is 10° F. warmer than the actual saturation temperature. By using the measured evaporator air exit temperature, a scale using the evaporator saturation temperature is provided by subtracting a constant temperature offset from the measured evaporator air exit temperature. This results in the scale shown in FIG. 6. The offset is permanently recorded on the indicator and is determined at initial installation of the indicator and thereafter assumed constant.

Figure 7:
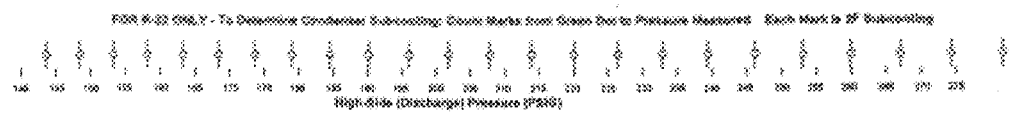
FIG. 7 is a schematic layout for the R-22 (HCFC-22) subcooling indicator scale for use with discrete micro-encapsulated liquid crystals (in 2° F. increments) and for pressures ranging from 140 to 275 PSIG.

FIG. 7 shows an R-22 refrigerant subcooling indicator scale for a pressure range from 140 to 275 psig. Finally, FIG. 8 shows an R-22 superheat scale in which the saturation pressure is assumed to be 68.51 psig, corresponding to a saturation temperature of 40° F. This scale is intended to be a simple though less accurate indicator which avoids the need for a secondary measurement. Such an indicator scale would be used, for example, in a conventional air conditioner in which the evaporator coil set-point (saturation point) is 40° F. with a normal operating superheat range of 3 to 15° F.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of determining superheating or subcooling in a vapor-compression system, comprising:
   (a) attaching a body to an appropriate location in the vapor-compression system;
   (b) measuring a value representative of one of low-side suction pressure, high-side pressure, evaporator or condenser saturation temperature and evaporator or condenser exit air temperature;
   (c) locating the measured value on a scale containing a range of values on the body; and
   (d) referencing adjacent temperature-sensitive indicia disposed along the body to indicate an amount, if any, of evaporator superheating or condenser subcooling.

2. The method according to claim 1, wherein the indicia are formed of liquid crystal material.

3. The method according to claim 1, wherein the appropriate location is an evaporator exit, and low-side suction pressure is measured with a service valve at a region near the body.

4. The method according to claim 1, wherein the appropriate location is a condenser exit, and high-side pressure is measured with a service valve at a region near the body.

5. The method according to claim 1, wherein the indicia are formed by mercury in a tube with temperature graduations.

6. The method according to claim 5, wherein the appropriate location is an evaporator exit, and low-side suction pressure is measured with a service valve at a region near the body.

7. The method according to claim 5, wherein the appropriate location is a condenser exit, and high-side pressure is measured with a service valve at a region near the body.

8. The method according to claim 1, wherein the indicia constitute spaced graduation points arranged such that graduation points located to the right of the measured value indicate an amount of superheat, and graduation points located to the left of the measured value indicate an amount of subcooling.

9. The method according to claim 8, wherein the indicia are of a green color when the system is at the design superheat temperature, are of a blue color when they are warmer by about 1° F. and are of a tan color when they are cooler by about 1° F.

10. A method for determining superheat, comprising the step of providing a device with a temperature indicator, an optionally corresponding scale, and temperature graduations, and using the device to determine superheat by reference to the scale and associated temperature graduation, wherein the corresponding scale is a pressure saturation scale in which corresponding pressures indicated on the saturation pressure scale correspond to saturation temperatures for a specific refrigerant, which saturation temperatures are the actual indicated temperatures of the temperature indicator.

11. The method according to claim 10, wherein the scale is an evaporator exit air temperature scale arranged to correspond to a saturation pressure scale for determining superheat.

12. The method according to claim 10, wherein the scale is an evaporator surface temperature scale arranged to correspond to a saturation pressure scale for determining superheat.

13. The method according to claim 10, wherein an evaporator operating pressure is assumed, thereby obviating the need for the optional corresponding scale.

14. The method according to claim 10, wherein the temperature graduations represent appropriate indicated temperatures of the temperature indicator.

15. The method according to claim 10, wherein the temperature indicator comprises discrete liquid crystal temperature indicators.

16. The method according to claim 11, wherein the device is used to measure superheat in air conditioning, refrigeration, or vapor compression heat pump systems when combined with a pressure reading.

17. A method for determining subcooling, comprising the step of providing a device that includes a temperature indicator, a corresponding scale, and temperature graduations, wherein the scale is a saturated pressure scale, and corresponding pressures indicated on the saturation pressure scale correspond to saturation temperatures for specific refrigerant, which saturation temperatures are actual indicated temperatures of the temperature indicator.

18. The method according to claim 17, wherein the scale is a condenser exit air temperature scale arranged to correspond to a saturation pressure scale, for determining superheat.

19. The method according to claim 17, wherein the scale is a condenser surface temperature scale arranged to correspond to a saturation pressure scale for determining superheat.

20. The method according to claim 17, wherein condenser operating pressure is assumed.

21. A method for determining subcooling, comprising the step of providing a device that includes a temperature indicator, a corresponding scale, and temperature graduations, wherein the device is used to measure subcooling in air conditioning, refrigeration, or vapor compression heat pump systems when combined with a pressure reading.

22. A vapor-compression system superheating/subcooling indicator, comprising a body;

a graduated scale on the body with each of the graduations being representative of one of low-side suction pressure, high-side suction pressure, evaporator or condenser saturation temperature and evaporator or condensing exit air temperature; and temperature-sensitive indicia located adjacent the graduated scale and operative to indicate an amount, if any, of evaporator superheating or subcooling when referenced from one of the graduations on the scale.

23. An indicator according to claim 22, wherein the indicia are formed of liquid crystal material.

24. A indicator according to claim 23, wherein the indicia constitute spaced graduation points arranged such that graduation points located to the right of the measured value indicate an amount of superheat, and graduation points located to the left of the measured value indicate an amount of subcooling.

25. An indicator according to claim 24, wherein the indicia are of a green color when the system is at the design superheat temperature, are of a blue color when they are warmer by about 1° F. and are of a tan color when they are cooler by about 1° F.

26. An indicator according to claim 22, wherein the indicia are formed by mercury in a tube with temperature graduations.

* * * * *